United States Patent
Wu et al.

(10) Patent No.: US 9,193,909 B2
(45) Date of Patent: Nov. 24, 2015

(54) LIQUID CRYSTAL COMPOSITION AND LIQUID CRYSTAL DISPLAY DEVICE WITH THE LIQUID CRYSTAL COMPOSITION

(75) Inventors: Feng Wu, Yangzhong (CN); Wenming Han, Yangzhong (CN); Hongwei Zhang, Yangzhong (CN); Yudong Tan, Yangzhong (CN); Canhui Jin, Yangzhong (CN); Xia Zhu, Yangzhong (CN)

(73) Assignee: JIANGSU HECHENG DISPLAY TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 14/235,628

(22) PCT Filed: Jul. 31, 2012

(86) PCT No.: PCT/CN2012/001024
§ 371 (c)(1),
(2), (4) Date: Mar. 7, 2014

(87) PCT Pub. No.: WO2013/016948
PCT Pub. Date: Feb. 7, 2013

(65) Prior Publication Data
US 2014/0191158 A1    Jul. 10, 2014

(30) Foreign Application Priority Data
Aug. 2, 2011  (CN) .......................... 2011 1 0219223

(51) Int. Cl.
| | | |
|---|---|---|
| G02F 1/1333 | (2006.01) | |
| C09K 19/32 | (2006.01) | |
| C09K 19/44 | (2006.01) | |
| C09K 19/04 | (2006.01) | |
| C09K 19/12 | (2006.01) | |
| C09K 19/30 | (2006.01) | |

(52) U.S. Cl.
CPC ............. C09K 19/32 (2013.01); C09K 19/3066 (2013.01); C09K 19/44 (2013.01); *C09K 2019/0444* (2013.01); *C09K 2019/0466* (2013.01); *C09K 2019/123* (2013.01); *C09K 2019/124* (2013.01); *C09K 2019/3004* (2013.01); *C09K 2019/3021* (2013.01); *C09K 2019/3025* (2013.01)

(58) Field of Classification Search
CPC .... C09K 19/32; C09K 19/44; C09K 19/3066; C09K 2019/0444; C09K 2019/0466; C09K 2019/123; C09K 2019/124; C09K 2019/3004; C09K 2019/3021; C09K 2019/3025
USPC ............... 252/299.01, 299.6, 299.61, 299.62, 252/299.63, 299.66; 428/1.1; 349/167, 182
See application file for complete search history.

(56) References Cited

U.S. PATENT DOCUMENTS

| | | | |
|---|---|---|---|
| 6,596,349 B2 | 7/2003 | Kondou et al. | |
| 7,390,538 B2 | 6/2008 | Manabe et al. | |
| 7,732,023 B2 * | 6/2010 | Saito .............................. | 428/1.1 |
| 7,749,576 B2 | 7/2010 | Tomi | |
| 8,012,369 B2 | 9/2011 | Saito et al. | |
| 8,057,866 B2 * | 11/2011 | Saito .............................. | 428/1.1 |
| 8,283,492 B2 | 10/2012 | Harmer et al. | |
| 8,475,888 B2 | 7/2013 | Tanaka et al. | |
| 2011/0062384 A1 | 3/2011 | Yanai et al. | |
| 2012/0190897 A1 | 7/2012 | Yamashita et al. | |
| 2013/0119310 A1 | 5/2013 | Tanaka | |
| 2014/0240653 A1 | 8/2014 | Lee et al. | |

FOREIGN PATENT DOCUMENTS

| | | |
|---|---|---|
| CN | 1231655 A | 10/1999 |
| CN | 1823151 A | 8/2006 |
| CN | 101031631 A | 9/2007 |
| CN | 101193856 A | 6/2008 |
| CN | 101652453 A | 2/2010 |
| CN | 102337139 A | 2/2012 |
| EP | 2292720 A1 | 3/2011 |
| WO | 2010047260 A1 | 4/2010 |
| WO | 2011040373 A1 | 4/2011 |
| WO | 2011083677 A1 | 7/2011 |

* cited by examiner

*Primary Examiner* — Geraldina Visconti
(74) *Attorney, Agent, or Firm* — Laurence Greenberg; Werner Stemer; Ralph Locher

(57) ABSTRACT

A liquid crystal composition that is useful for an active matrix (AM) device has a nematic phase and positive dielectric anisotropy. An active matrix liquid crystal display device includes the liquid crystal composition. By the total weight of the liquid crystal composition, the liquid crystal composition comprises 8%-50% of a compound of the general formula (I), 10%-70% (by weight) of a compound of the general formula (II), and 5%-50% (by weight) of a compound of the general formula (III).

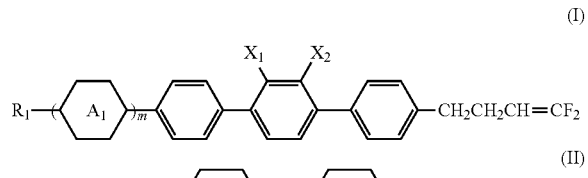

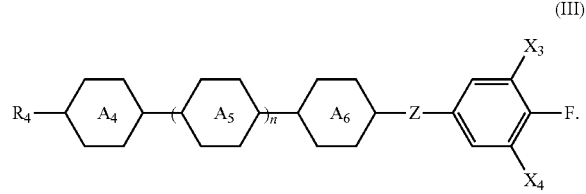

13 Claims, 3 Drawing Sheets

LIQUID CRYSTAL COMPOSITION AND LIQUID CRYSTAL DISPLAY DEVICE WITH THE LIQUID CRYSTAL COMPOSITION

TECHNICAL FIELD

The present invention relates to a liquid crystal composition applicable for an AM (active matrix) device and the like, and an AM device containing the same, and specifically relates to a composition having a nematic phase and a composition having positive dielectric anisotropy.

BACKGROUND ARTS

Regarding a liquid crystal display device, based on the displaying mode of the liquid crystal, it can be classified into the types of PC (phase change), TN (twisted nematic), STN (super twisted nematic), ECB (electrically controlled birefringence), OCB (optically compensated bend), IPS (in-plane switching), VA (vertical alignment) and the like. Based on the driving mode of the device, it can be classified into the PM (passive matrix) type and the AM (active matrix) type. PM is classified into the static type, multiplex type and so forth, and AM is classified into TFT (thin film transistor) type, MIM (metal insulator metal) type and so forth. The types of TFT comprise amorphous silicon and polycrystal silicon. The latter is classified into a high temperature type and a low temperature type according to the manufacturing process. Based on the type of the light source, the liquid crystal display device is classified into a reflection type utilizing a natural light, a transmission type utilizing a backlight and a semi-transmission type utilizing both the natural light and the backlight.

Liquid crystal materials are required to have good chemical and heat stability, as well as the good stabilities to electric field and electromagnetic radiation. In addition, the liquid crystal materials should have low viscosity, short response time, low threshold voltage and high contrast ratio. Various performance index of the liquid crystal composition are improved so as to obtain AM devices with good characteristics. The relationships between one performance of the liquid crystal composition and the corresponding performance of the AM device are summarized in Table 1 below. The various performance index of the composition will be further explained based on a commercially available AM device. The temperature range of a nematic phase relates to the working temperature range of the device. A desirable upper limit temperature of the nematic phase is 70° C. or more, and a desirable lower limit temperature of the nematic phase is –10° C. or less. The viscosity of the composition relates to the response time of the device. A short response time of the device is desirable for displaying a moving image in the device. Accordingly, a small viscosity of the composition is desirable. A small viscosity of the composition at a low temperature is more desirable.

TABLE 1

The general characteristics of the composition and the AM device

| No. | The general characteristics of the composition | The general characteristics of the AM device |
|---|---|---|
| 1 | Temperature range of a nematic phase is wide. | Usable temperature range is wide. |
| 2 | Viscosity is small. | Response time is short. |
| 3 | Optical anisotropy is suitable. | Contrast ratio is large. |
| 4 | Dielectric anisotropy is positively or negatively large. | Threshold voltage is low, electric power consumption is small, and a contrast ratio is large. |
| 5 | Specific resistance is large. | Voltage holding ratio is large, and a contrast ratio is large. |
| 6 | Stable to ultraviolet light and heat. | Service life is long. |

The optical anisotropy of the composition relates to the contrast ratio of the device. The product value (Δn*d) of the optical anisotropy (Δn) of the liquid crystal composition and the thickness (d) of the liquid crystal layer can be designed to be a fixed value. A suitable product value depends on the kind of operation mode. In a device having a TN mode, a suitable value is approximately 0.45 μm. In this case, a composition having a large optical anisotropy is desirable for a device having a small thickness of the liquid crystal layer. A large dielectric anisotropy of the composition contributes to a low threshold voltage, a small electric power consumption and a large contrast ratio of the device. Accordingly, a large dielectric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance at room temperature and also at a high temperature is desirable after it has been used for a long time. A stability of the composition to an ultraviolet light and heat relates to a service life of the liquid crystal display device. The service life of the device is long when the stability is high. These characteristics are desirable for an AM device used for a liquid crystal projector, a liquid crystal television and so forth.

A desirable AM device is characterized as having a usable temperature range that is wide, a response time that is short, a contrast ratio that is large, a threshold voltage that is low, a voltage holding ratio that is large, a service life that is long, and so forth. Even a one millisecond shorter response time is desirable. Thus, the composition having characteristics such as a high upper limit temperature of a nematic phase, a low lower limit temperature of a nematic phase, a small viscosity, a large optical anisotropy, a large dielectric anisotropy, a large specific resistance, a high stability to an ultraviolet light, a high stability to heat, and so forth is especially desirable.

A single liquid crystal compound is usually difficult to present its characteristics, thus normally it is mixed with a variety of other liquid crystal compounds to prepare a composition. Therefore, we need a liquid crystal composition having the above advantages. A compound mentioned in CN Publication No. CN1823151A was formulated into a liquid crystal composition and would better characteristics. The structure of the compound is as follows:

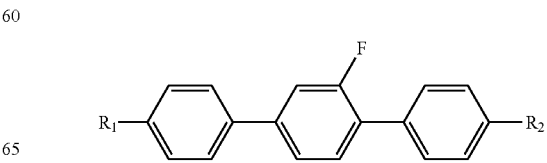

However, the dielectric anisotropy of the compound mentioned in this patent application is still not large enough.

The inventive structure in EP Publication No. EP2292720A1 is as follows:

However, the compounds mentioned in this document can not satisfy the requirements of the present invention alone.

One of the purposes of the present invention is to provide a liquid crystal composition, which satisfies at least one characteristic among the characteristics of high upper limit temperature of a nematic phase, low lower limit temperature of a nematic phase, small viscosity, large optical anisotropy, large dielectric anisotropy, large specific resistance, high stability to ultraviolet light, high stability to heat and so on. Another purpose of the present invention is a liquid crystal composition which is properly balanced regarding at least two of the characteristics. Another purpose of the present invention is a liquid crystal display device containing such composition. Another purpose of the present invention is an AM device which comprises a composition having the characteristics of large optical anisotropy, large dielectric anisotropy, high stability to ultraviolet light and so on, and the AM device has the characteristics of short response time, large voltage holding ratio, large contrast ratio, long service life and so forth.

SUMMARY OF THE INVENTION

One aspect of the present invention provides a liquid crystal composition, by the total weight of the liquid crystal composition, comprising:

8%-50% of compound expressed by general formula (I)

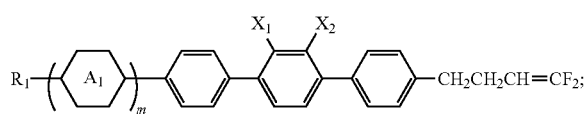

10%-70% (by weight) of compound expressed by general formula (II)

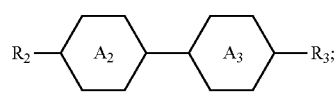

5%-50% (by weight) of compound expressed by general formula (III)

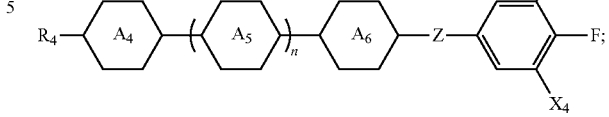

0-20% (by weight) of compound expressed by a general formula (IV)

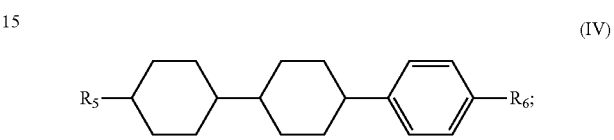

and 0-15% (by weight) of compound expressed by a general formula (V)

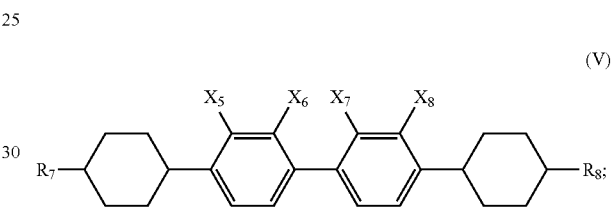

wherein, $R_1$ is a $C_{1-10}$ alkyl;

$R_2$, $R_3$ and $R_4$ are independently $C_{1-10}$ alkyl or alkoxy, $C_{2-10}$ alkenyl or $C_{2-10}$ alkenyl of which arbitrary hydrogen atom is substituted by fluorine atom;

$X_1$, $X_2$, $X_3$ and $X_4$ are independently hydrogen or fluorine, wherein $X_1$ and $X_2$ are not simultaneously hydrogen or fluorine;

Z is —CO—O—, —O—CO—, —CF$_2$O—, —OCF$_2$—, —CH$_2$O—, —OCH$_2$—, —CH$_2$CH$_2$—, —(CH$_2$)$_4$—, —C$_2$F$_4$—, —CH$_2$CF$_2$—, —CF=CF—, —CH=CH— or a single bond; and m, n are 0 or 1;

$A_1$, $A_2$, $A_3$ are trans-1,4-cyclohexylidene or 1,4-phenylene;

$A_4$, $A_5$ and $A_6$ independently represent one of the following groups:

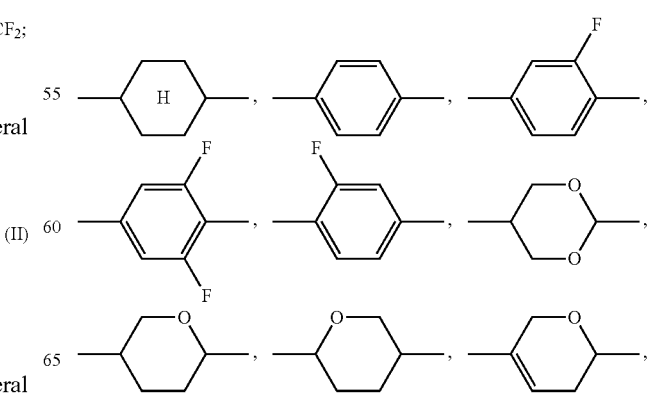

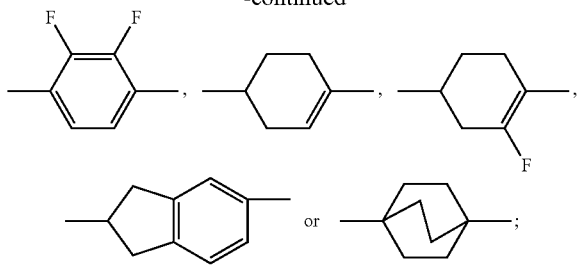

$R_5$, $R_6$ are independently $C_{1-10}$ alkyl or $C_{2-10}$ alkenyl;
$R_7$, $R_8$ are independently $C_{1-10}$ alkyl;
$X_5$, $X_6$, $X_7$ and $X_8$ are independently hydrogen or fluorine, and for each case, only one of $X_5$, $X_6$, $X_7$ and $X_8$ can be fluorine and the others are all hydrogen.

Another aspect of the present invention provides a liquid crystal display device comprising the liquid crystal composition of the present invention.

Specifically, the present invention relates to a liquid crystal composition and a liquid crystal display device containing the composition. The above liquid crystal composition comprises at least one compound selected from the group of compounds expressed by formula (I) as a first component, at least one compound selected from the group of compounds expressed by formula (II) as a second component, and at least one compound selected from the group of compounds expressed by formula (III) as a third component, and the above liquid crystal composition has a nematic phase.

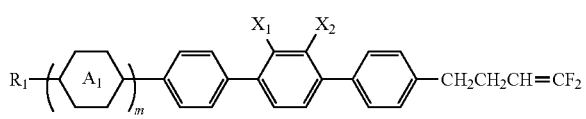

(I)

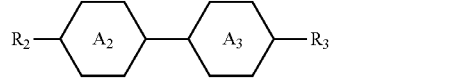

(II)

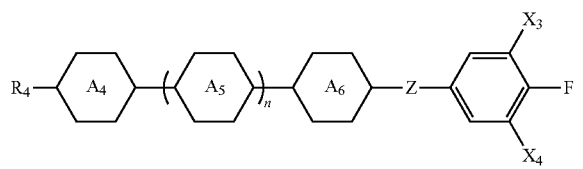

(III)

In the compounds expressed by the above general formulas (I), (II) and (III):

$R_1$ is a $C_{1-10}$ alkyl, preferably, is a $C_{2-7}$ alkyl;

$R_2$, $R_3$ and $R_4$ are independently $C_{1-10}$ alkyl or alkoxy, $C_{2-10}$ alkenyl or $C_{2-10}$ alkenyl of which arbitrary hydrogen atom is substituted by fluorine atom; preferably, $R_2$, $R_3$ and $R_4$ are independently $C_{2-7}$ alkyl or alkoxy, $C_{2-7}$ alkenyl or $C_{2-7}$ alkenyl of which arbitrary hydrogen is substituted by fluorine;

$X_1$, $X_2$, $X_3$ and $X_4$ are independently hydrogen or fluorine, wherein $X_1$ and $X_2$ are not simultaneously hydrogen or fluorine;

Z is —CO—O—, —O—CO—, —CF$_2$O—, —OCF$_2$—, —CH$_2$O—, —OCH$_2$—, —CH$_2$CH$_2$—, —(CH$_2$)$_4$—, —C$_2$F$_4$—, —CH$_2$CF$_2$—, —CF═CF—, —CH═CH— or a single bond, preferably, is —CF$_2$O—, —CH$_2$CH$_2$— or a single bond; and m, n are 0 or 1, wherein m is preferably 0;

$A_1$, $A_2$, $A_3$ in the general formulas (I) and (II) are independently trans-1,4-cyclohexylidene or 1,4-phenylene;

$A_4$, $A_5$ and $A_6$ in the general formula (III) are independently selected from the following groups:

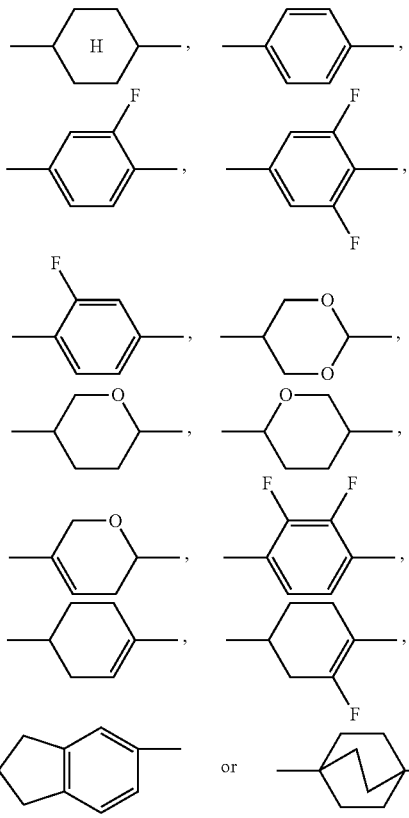

preferably, $A_4$, $A_5$ and $A_6$ in the general formula (III) are independently selected from the following groups:

In the liquid crystal composition of the present invention, the type I monomers expressed by the general formula (I) have extremely high optical anisotropy, which makes increasing the refractivity of the liquid crystal composition possible. Since the end of alkene chain comprises two fluorine atoms, larger dielectric anisotropy can be achieved, and the functions, such as stability again ultraviolet light, stability again heat and so on, are enhanced at the same time.

In the liquid crystal composition of the present invention, the type II compounds expressed by the general formula (II) have low viscosity and melting points, which greatly improves the response time of the product and provides good miscibility to the mixed liquid crystal.

In the liquid crystal composition of the present invention, the type III compounds expressed by the general formula (III) have high polarity, which makes reducing the threshold voltage of the liquid crystal composition possible.

The liquid crystal composition of the present invention comprises one or more type I compounds in accord with the general formula (I), one or more type II compounds in accord with the general formula (II), one or more type III compounds in accord with the general formula (III).

The present invention can further comprise one or more compounds expressed by general formula (IV) as a fourth component of the liquid crystal composition of the present invention,

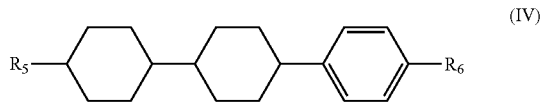
(IV)

wherein, $R_5$, $R_6$ are independently $C_{1-10}$ alkyl, $C_{2-10}$ alkenyl, preferably, are $C_{2-7}$ alkyl or $C_{2-7}$ alkenyl.

The type IV compounds expressed by the general formula (IV) have lower viscosity, and can increase the upper limit of the working temperature of the liquid crystal composition to a certain degree.

The present invention can further comprise one or more compounds expressed by general formula (V) as a fifth component,

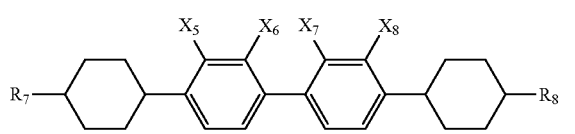
(V)

wherein, $R_7$, $R_8$ are independently $C_{1-10}$ alkyl, preferably are $C_{2-7}$ alkyl. $X_5$, $X_6$, $X_7$ and $X_8$ are independently hydrogen or fluorine, and for each case, only one of $X_5$, $X_6$, $X_7$ and $X_8$ can be fluorine and the others are all hydrogen.

The type V compounds expressed by the general formula (V) have extremely high clearing points, which can greatly increase the upper limit of the working temperature of the liquid crystal composition.

By weight percents, the ratio of the components of said nematic liquid crystal composition of the present invention are respectively: the compound expressed by the general formula (I) is 8%-50%, the compound expressed by the general formula (II) is 10%-70%, the compound expressed by the general formula (III) is 5-50%, the compound expressed by the general formula (IV) is 0-20%, the compound expressed by the general formula (V) is 0-15%. Preferably, said liquid crystal composition comprises: 10%-40% of the compound expressed by the general formula (I), 15%-65% of the compound expressed by the general formula (II), 6-40% of the compound expressed by the general formula (III), 0-15% of the compound expressed by the general formula (IV), and 0-10% of the compound expressed by the general formula (V).

The present invention will be illustrated by combining the detailed embodiments below. It should be noted that, the following examples are optimums of the present invention, which are only used to illustrate the present invention, not to limit it. Other combinations and various modifications within the conception of the present invention are possible without departing from the subject matter and scope of the present invention.

Figure 1A:
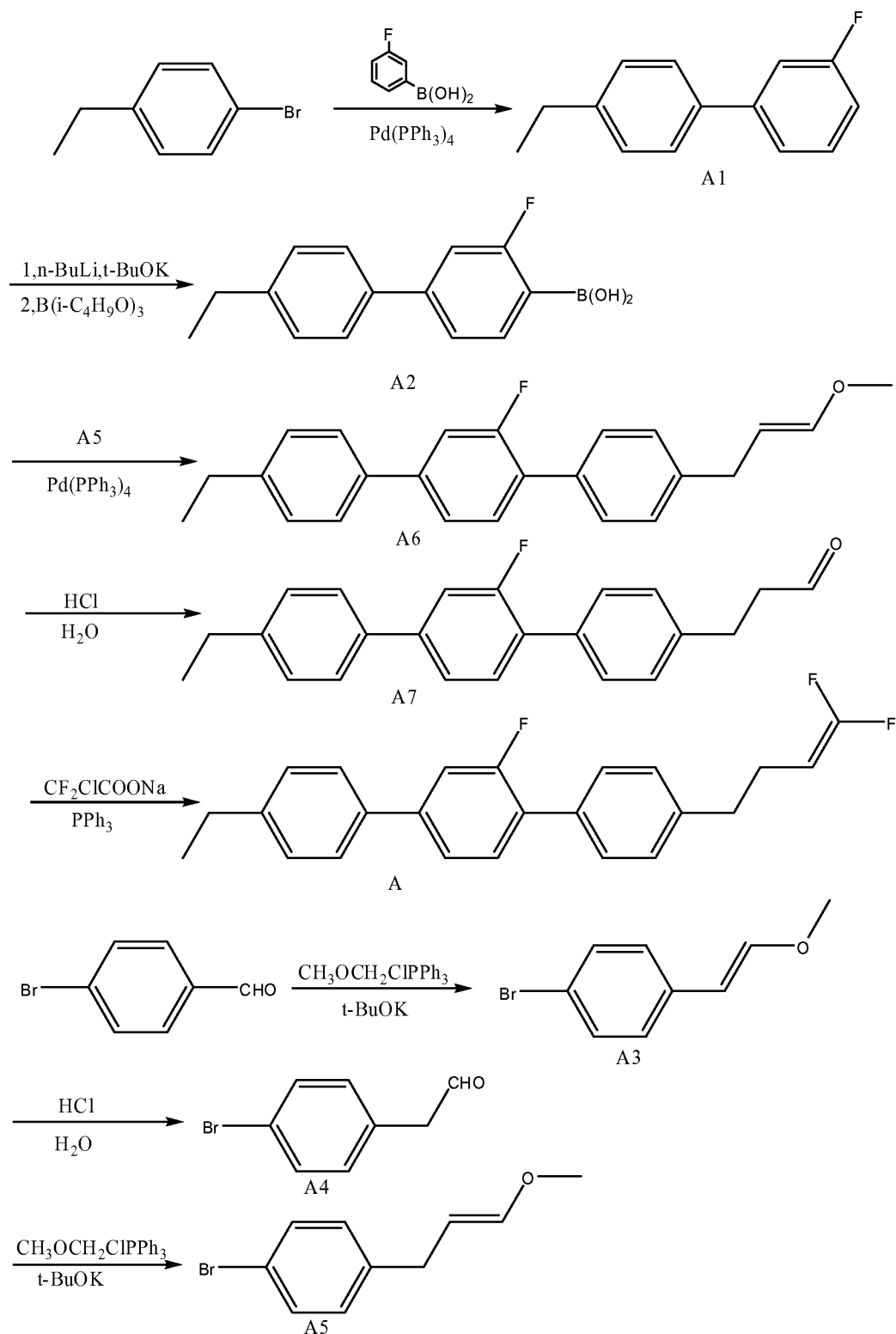
FIG. 1A is a synthetic route of the compound of formula (I-2)

For the convenience of the expression, the unit structures of the liquid crystal compounds in the following examples are represented by the codes listed in Table 2:

TABLE 2

| The codes of the unit structures of the liquid crystal compounds | | |
|---|---|---|
| The unit structure | Code | The name of the group |
| (cyclohexyl ring) | C | cyclohexyl |
| (phenylene ring) | P | phenylene |
| —$C_nH_{2n+1}$ or —$C_mH_{2m+1}$ | n or m | alkyl |
| —CH=CH— | V | alkenyl |
| —$CH_2CH_2$— | 2 | ethyl bridge bond |
| (2-fluorophenyl) | G | 2-fluorophenyl-1,4-diyl |
| (2,6-difluorophenyl) | U | 2,6-difluorophenyl-1,4-diyl |
| —O— | O | oxygen |
| —$CF_2O$— | Q | difluoro-substituted ether group |
| —F | F | fluorine |
| (indane) | I | indane-2,5-diyl |

Take a compound of the following structural formula as an example:

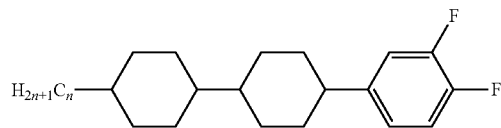

Represented by using the codes listed in Table 1, this structural formula can be expressed as: nCCGF, wherein, the n in the code represents the number of the carbon atoms of the alkyl group, for example, n is "3" means the alkyl is —$C_3H_7$; the C in the code represents a cyclohexyl.

The abbreviated codes of the test items in the following Examples are respectively represented as:

| | |
|---|---|
| TN(℃) ( | clearing point (nematic-isotropy phase transition temperature) |
| Viscosity | flow viscosity ($mm^2 \cdot s^{-1}$, 20° C., except as otherwise noted) |
| Δn | optical anisotropy (589 nm, 20° C.) |
| Δε | dielectric anisotropy (1 KHz, 25° C.) |
| VHR-1 | Voltage Holding Ratio (25° C., starting) |
| VHR-2 | Voltage Holding Ratio (25° C., UV exposure) |
| VHR-3 | Voltage Holding Ratio (25° C., high temperature baking) | wherein, the flow viscosity (Visc) was tested by cone-plate viscometer; the refractivity anisotropy was tested and obtained by using abbe refractometer under sodium lamp (589 nm) light source at 20° C.; the dielectric test cell was the type TN90, and the cell gap was 7 μm; the VHR was tested and obtained by TOYO6254 equipment at 25° C.

DETAILED EMBODIMENTS

The ingredients used in the following examples are all synthesized by the inventor of the present application according to the well-known methods. These synthetic techniques are normal, and via testing, the obtained liquid crystal compounds meet the standards of the electronic compounds.

The following synthetic route is only one method for the compounds II-V for purpose of illustration, while other known synthetic methods can also be used to obtain these compounds.

A simple synthetic route of one compound expressed by general formula II is as follows:

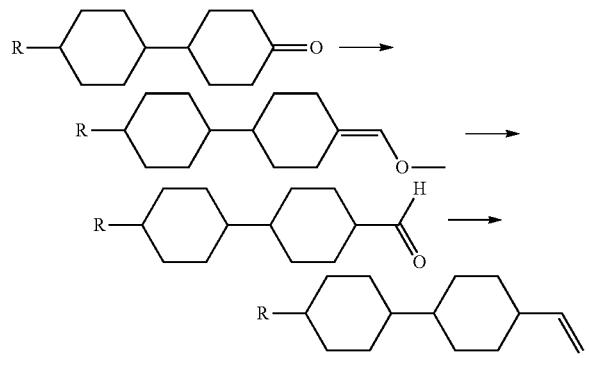

A simple synthetic route of one compound expressed by general formula III is as follows:

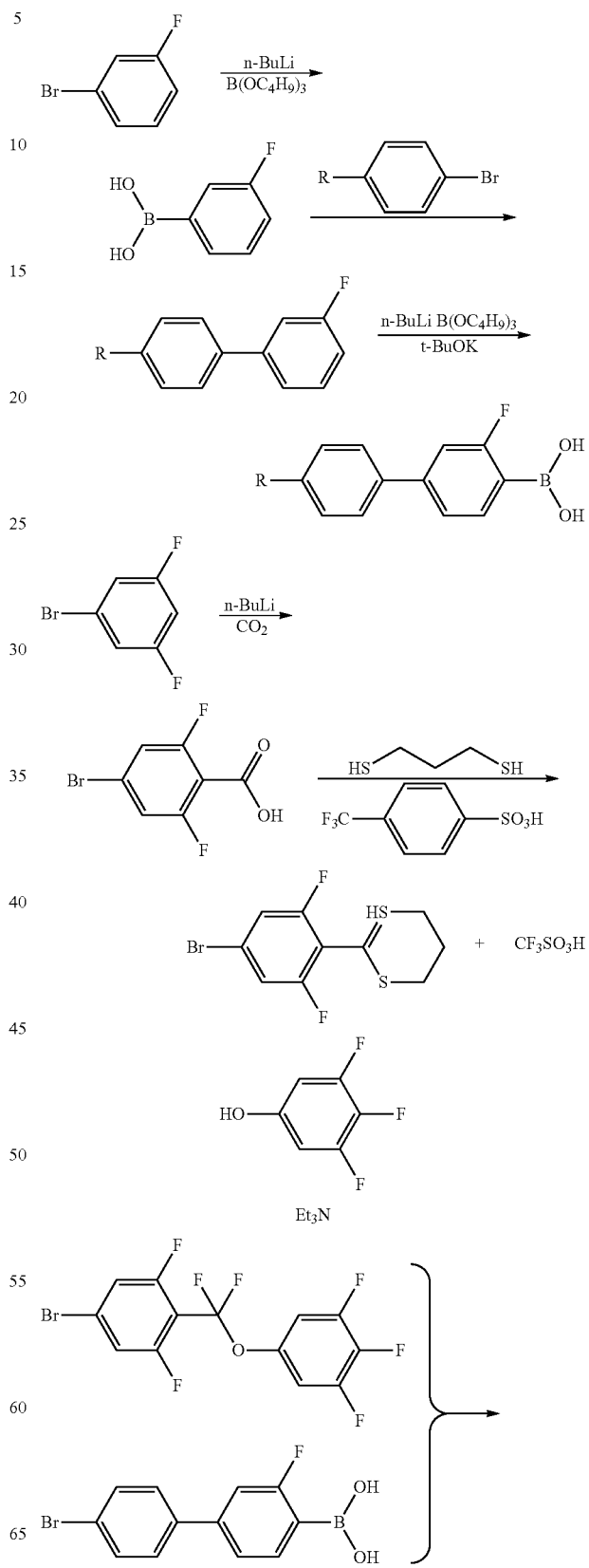

11

-continued

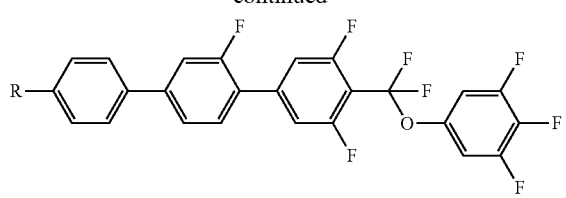

A simple synthetic route of one compound expressed by general formula IV is as follows:

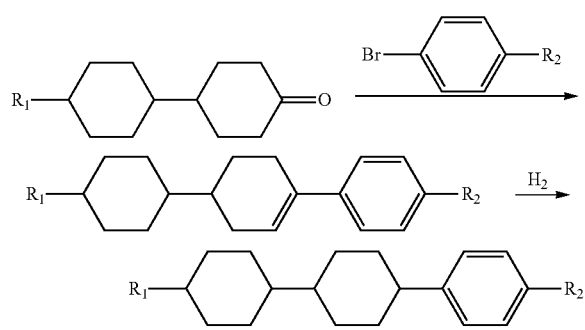

A simple synthetic route of one compound expressed by general formula V is as follows:

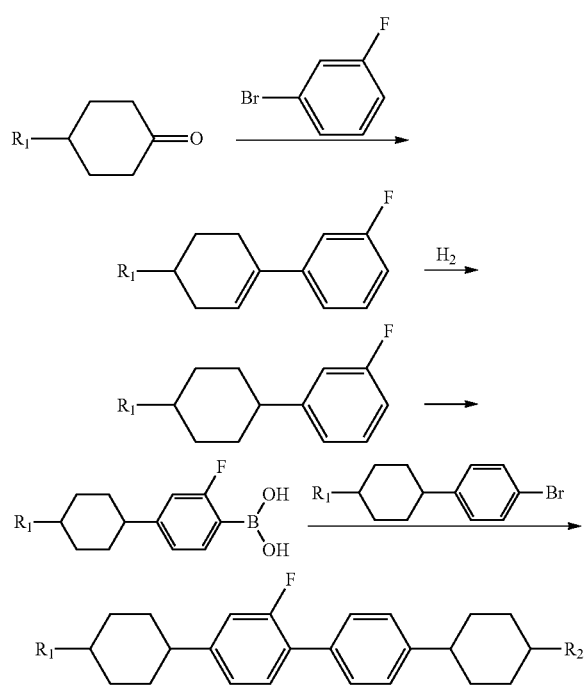

Liquid crystal compositions are prepared according to the formulations of the compositions specified in the following comparison example and the examples. The preparation of the liquid crystal compositions proceeds according to conventional methods in the art, such as prepared by mixing according to a specified formulation using a manner such as heating, ultrasound, suspension and so on.

12

PREPARATION EXAMPLE 1

The Preparation of the Compound of Formula (I-2)

The synthetic route of the compound of formula (I-2) is shown in FIG. 1A, in which the compound expressed as compound A is the compound of formula (I-2) of the present invention. The preparation process is as follows:

1. The Synthesis of A1

70 g m-fluorophenylboronic acid, 93 g bromo-4-ethylbenzene, 1.6 L toluene, 0.8 L ethanol, 0.8 L water and 212 g sodium carbonate are added into a 5 L three-necked flask. Under the protection of nitrogen, 3 g $Pd(PPh_3)_4$ is added, and the mixture is heated and refluxed for 6 h. After the reaction is complete, the mixture is post-processed normally. 75 g of a colourless liquid is obtained through reduced pressure distillation purification. GC≥99%, Yield: 75%;

2. The Synthesis of A2

20 g A1, 200 ml anhydrous tetrahydrofuran and 10 g potassium t-butoxide are added into a 500 ml three-necked flask. Under the protection of nitrogen and a temperature lowered to −100° C., 50 ml n-butyllithium solution (2.4 mol/L n-hexane solution) is dropwise added. When the dropwise addition is complete, the mixture is stirred for 2 h while the temperature is controlled at −100° C. Then 30 g tri-isobutyl borate is dropwise added, and the temperature naturally rises to room temperature. The mixture is post-processed, and 18 g of a light yellow solid is obtained through a beating purification with petroleum ether. Yield: 74%;

3. The Synthesis of A3

8.5 kg (methoxymethyl)triphenylphosphonium chloride and 30 L anhydrous tetrahydrofuran are added into a 50 L reaction vessel. Under the protection of nitrogen and a temperature lowered to −5° C., 3.2 kg potassium t-butoxide is added in batch (the temperature of each batch is controlled lower than 5° C.), and stirred for 30 minutes. A mixture of 3.5 kg p-bromo benzaldehyde and 10 L anhydrous tetrahydrofuran is dropwise added. The temperature during the process of dropwise addition is controlled lower than 10° C. After the dropwise addition is complete, the temperature naturally rises to room temperature. The stir is continued for another 6 h. The mixture is post-processed normally. 4.1 kg of a yellow liquid is obtained through column chromatography purification. GC: 91% (a cis-trans mixture), Yield: 89%;

4. The Synthesis of A4

200 g A3, 600 ml tetrahydrofuran and 600 ml 10% hydrochloric acid aqueous solution are added into a 2 L three-necked flask. The mixture is heated till a slight reflux, and is stirred for 4.5 h. After the reaction is complete, the mixture is post-processed normally. 167 g of a crude product is obtained after the solvent is removed. The crude product is not required to be purified, and is directly used in the next step. GC≥83%, Yield: 89%;

5. The Synthesis of A5

343 g (methoxymethyl)triphenylphosphonium chloride and 2 L anhydrous tetrahydrofuran are added into a 5 L three-necked flask. Under the protection of nitrogen and a temperature lowered to −5° C., 123 g potassium t-butoxide is added in batch (the temperature of each batch is controlled lower than 5° C.). After 30 minutes stir, a mixture of 167 g A4 obtained in the previous step and 500 mL anhydrous tetrahydrofuran is dropwise added. The temperature during the process of dropwise addition is controlled lower than 10° C. After the dropwise addition is complete, the temperature naturally rises to room temperature. The stir is continued for another 6 h. The mixture is post-processed normally. 180 g of a reddish brown liquid is obtained, which is not required to be purified and is directly used in the next step. GC: 77% (a cis-trans mixture), Yield: 94%;

6. The Synthesis of A6

18 g A2, 17 g A5, 240 ml toluene, 120 ml ethanol, 120 ml water and 30 g sodium carbonate are added into a 1 L three-necked flask. Under the protection of nitrogen, 0.4 g Pd(PPh$_3$)$_4$ is added, and the mixture is heated and refluxed for 6 h. After the reaction is complete, the mixture is post-processed normally. 12 g of a white solid is obtained through column chromatography and recrystallization purification with ethanol. GC≥85% (a cis-trans mixture), Yield: 47%;

7. The Synthesis of A7

Figure 1B:
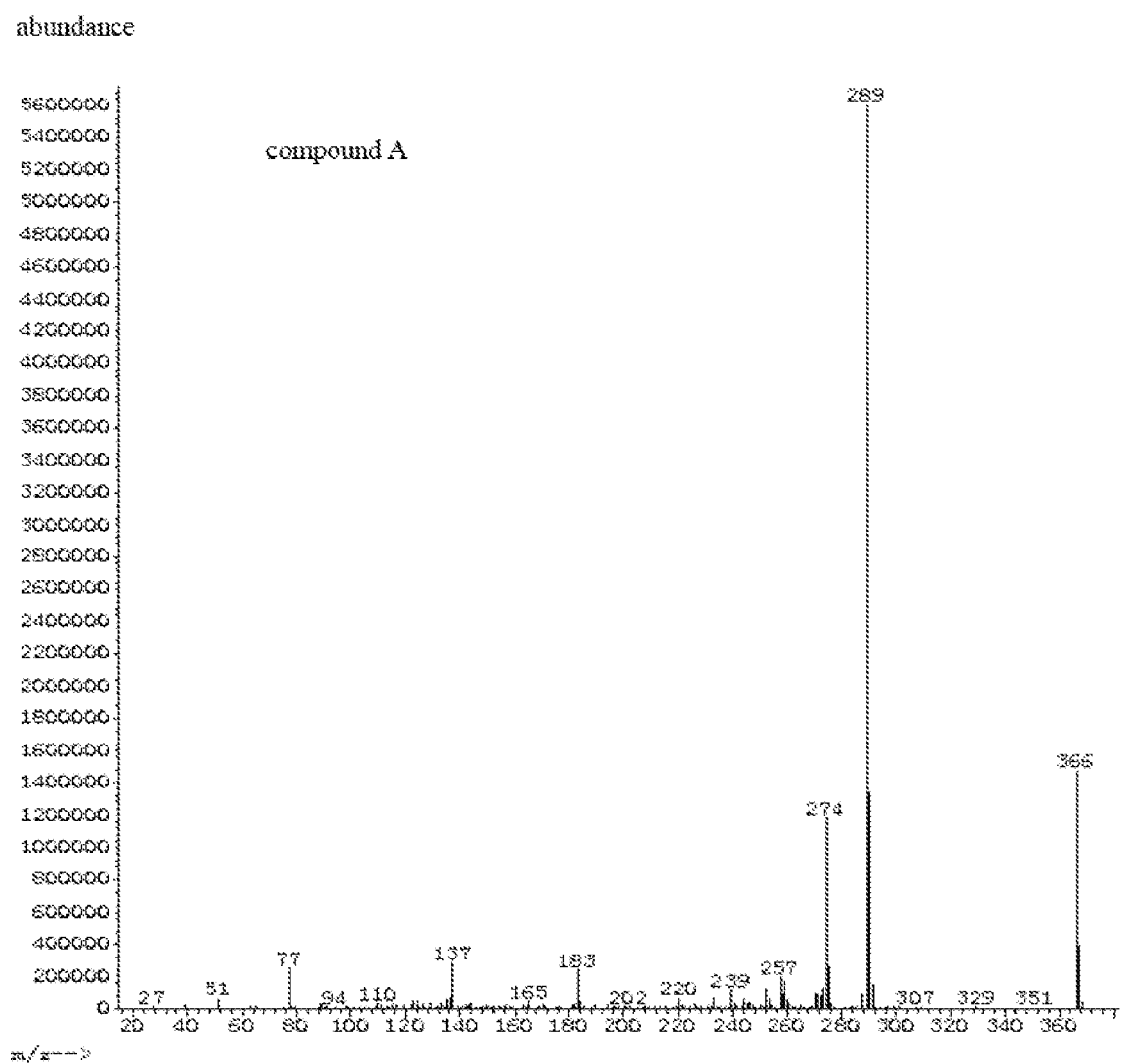
FIG. 1B is a mass spectrum of the compound of formula (I-2) obtained by the synthesis.

12 g A6, 25 ml tetrahydrofuran and 25 ml 10% hydrochloric acid aqueous solution are added into a 250 mL three-necked flask. The mixture is heated till a slight reflux is achieved, and is stirred for 4.5 h. After the reaction is complete, the mixture is post-processed normally. 5.5 g of a white solid is obtained through recrystallization with petroleum ether (90-120° C.). GC≥97%, Yield: 48%;

8. The Synthesis of A 5.5 g A7, 9 g triphenylphosphine, 10 g sodium chlorodifluoroacetate and 100 ml DMF are added into a 250 mL three-necked flask and heated to 90° C. to react for 6 h. After the reaction is complete, the mixture is post-processed normally. 3.5 g of a white solid is obtained through column chromatography purification. GC≥99%, Yield: 58%; Phase Transition: C39N126I. The mass spectrum of the compound A (the compound of formula (I-2)) is shown in FIG. 1B.

PREPARATION EXAMPLE 2

The Synthesis of the Compound of Formula (I-3)

The compound expressed as compound B is the compound of formula (I-3) of the present invention. The preparation process is as follows:

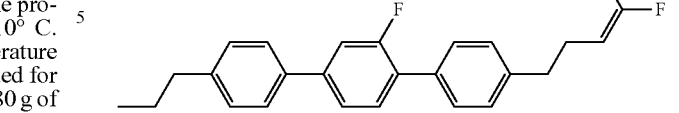

Figure 2:
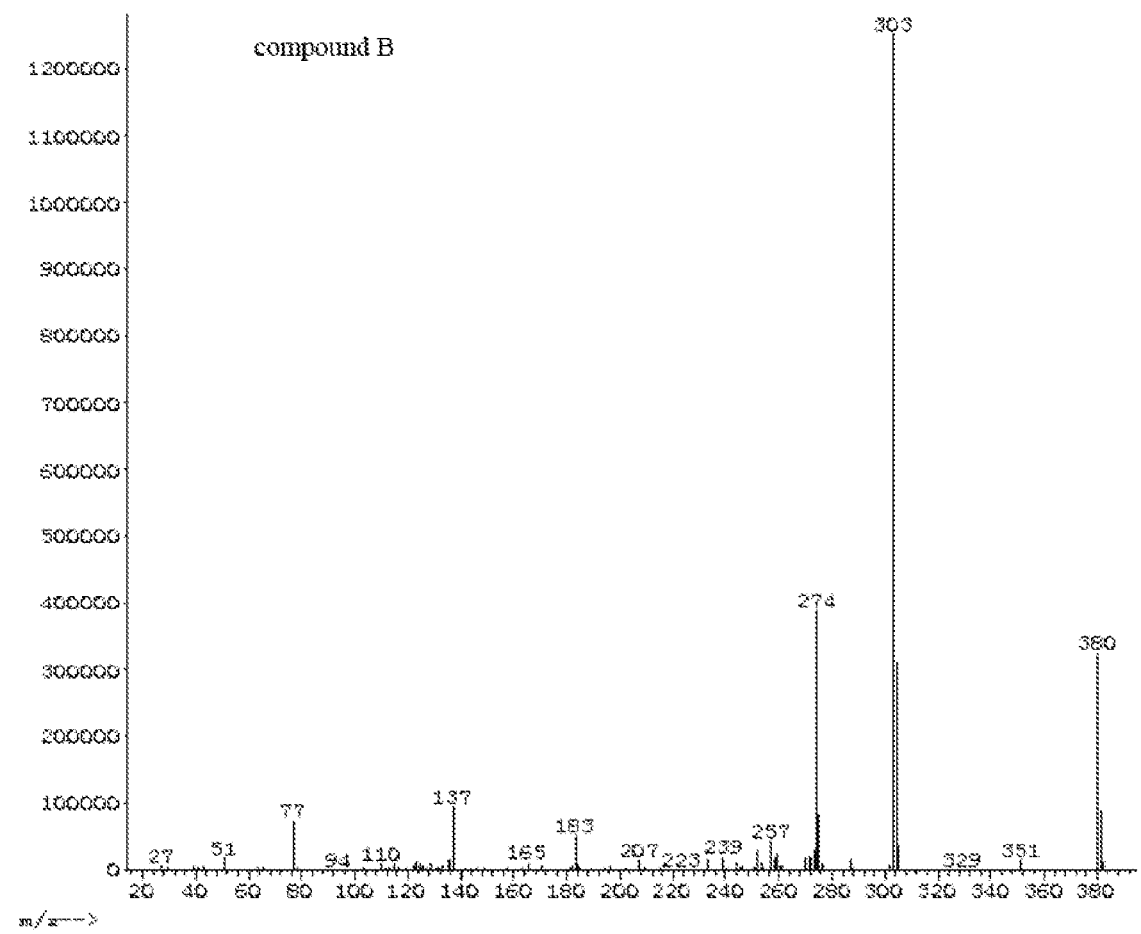
FIG. 2 is a mass spectrum of the compound of formula (I-3).

Using 1-bromo-4-propylbenzene as the raw material, a white solid compound B can be obtained by using the method of preparing the compound A. Phase Transition: C44S128N149I. The mass spectrum of the compound B (the compound of formula (I-3)) is shown in FIG. 2.

PREPARATION EXAMPLE 3

The Synthesis of the Compound of Formula (I-1)

The compound expressed as compound C is the compound of formula (I-1) of the present invention. The preparation process is as follows:

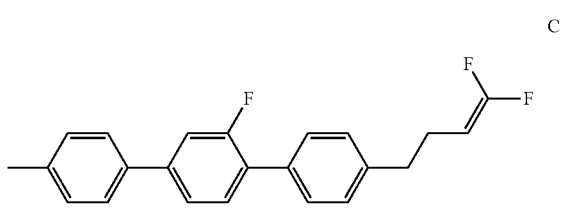 [SMILES: Cc1ccc(-c2ccc(-c3ccc(CCC=C(F)F)cc3)c(F)c2)cc1]

Using para-bromo toluene as the raw material, a white solid compound C can be obtained by using the method of preparing the compound A. Phase Transition: C66N151I.

COMPARISON EXAMPLE

The ingredients of the liquid crystal composition of the comparison example and the weight ratios thereof were listed in Table 3. The liquid crystal composition of the comparison example was filled between the two substrates of the liquid crystal display device to test its properties. The test results were also listed in Table 3.

TABLE 3

| | The ingredients of the liquid crystal composition of the comparison example and the weight ratios thereof Comparison example | | | |
|---|---|---|---|---|
| The codes of the components | The corresponding compound type in the liquid crystal composition of the present invention | Weight percent | The test results for the performance parameters | |
| 3PGP2V | | 7 | TN (□) ( | 78 |
| 3CCV | II | 35 | Δn (589 nm, 20° C.) | 0.100 |
| 3CCV1 | II | 8.5 | Viscosity (mm$^2$ · s$^{-1}$, 20° C.) | 11.7 |
| 2PGUF | III | 2.5 | Δε (1 KHz, 25° C.) | +3.5 |
| 3PUQUF | III | 17.5 | | |
| VCCP1 | IV | 15.5 | | |
| V2CCP1 | IV | 14 | | |
| Total | | 100 | | |

EXAMPLE 1

The liquid crystal composition of the invention was prepared according to the compounds listed in Table 4 and the weight ratios thereof, and was filled between two substrates of the liquid crystal display device to test its performance. The test data were also listed in Table 4.

TABLE 4

The components of Example 1 and the weight ratios thereof
Example 1

| The codes of the components | The corresponding compound type | Weight percent | The test results for the performance parameters | |
|---|---|---|---|---|
| 1PGP2V(2F) | I-1 | 7 | TN◯( | 81.6 |
| 2PGP2V(2F) | I-2 | 7 | Δn (589 nm, 20° C.) | 0.122 |
| 3PGP2V(2F) | I-3 | 7 | Viscosity (mm$^2 \cdot$s$^{-1}$, 20° C.) | 11.2 |
| 3CCV | II-1 | 46 | Δε (1 KHz, 25° C.) | +3.1 |
| 3CCV1 | II-2 | 5 | | |
| 2CPPF | III-1 | 6 | | |
| 3CPPF | III-2 | 6 | | |
| 5CPPF | III-3 | 6 | | |
| 3PGUQUF | III-4 | 5 | | |
| 4PGUQUF | III-5 | 5 | | |
| Total | | 100 | | |

EXAMPLE 2

The liquid crystal composition of the invention was prepared according to the compounds listed in Table 5 and the weight ratios thereof, and was filled between two substrates of the liquid crystal display device to test its performance. The test data were also listed in Table 5.

TABLE 5

The components of Example 2 and the weight ratios thereof
Example 2

| The codes of the components | The corresponding compound type | Weight percent | The test results for the performance parameters | |
|---|---|---|---|---|
| 1PGP2V(2F) | I-1 | 6 | TN◯( | 80.7 |
| 2PGP2V(2F) | I-2 | 6 | Δn (589 nm, 20° C.) | 0.119 |
| 3PGP2V(2F) | I-3 | 7 | Viscosity (mm$^2 \cdot$s$^{-1}$, 20° C.) | 12.4 |
| 3CCV | II-1 | 46 | Δε (1 KHz, 25° C.) | +3.4 |
| 3CCV1 | II-2 | 5 | | |
| 2CPPF | III-1 | 6 | | |
| 3CPPF | III-2 | 6 | | |
| 5CPPF | III-3 | 6 | | |
| 2IGUQUF | III-6 | 6 | | |
| 3IGUQUF | III-7 | 6 | | |
| Total | | 100 | | |

It can be seen from Example 1 and Example 2 that, on the basis that the viscosity did not significantly increase, the refractivity of the liquid crystal composition increased obviously, and thereby a thinner cell can be used to achieve a faster response speed.

EXAMPLE 3

The liquid crystal composition of the invention was prepared according to the compounds listed in Table 6 and the weight ratios thereof, and was filled between two substrates of the liquid crystal display device to test its performance. The test data were also listed in Table 6.

TABLE 6

The components of Example 3 and the weight ratios thereof
Example 3

| The codes of the components | The corresponding compound type | Weight percent | The test results for the performance parameters | |
|---|---|---|---|---|
| 1PGP2V(2F) | I-1 | 6 | TN◯( | 75.2 |
| 2PGP2V(2F) | I-2 | 6 | Δn (589 nm, 20° C.) | 0.122 |
| 3PGP2V(2F) | I-3 | 7 | Viscosity (mm$^2 \cdot$s$^{-1}$, 20° C.) | 12.6 |
| 3CCV | II-1 | 47 | Δε (1 KHz, 25° C.) | +3.4 |
| 5PP1 | II-3 | 6 | | |
| 2CPPF | III-1 | 4 | | |
| 3CPPF | III-2 | 4 | | |
| 3CCP3 | IV-1 | 4 | | |
| 3IUQUF | III-8 | 2 | | |
| 2IGUQUF | III-6 | 5 | | |
| 3IGUQUF | III-7 | 6 | | |
| 3CGPC3 | V-1 | 3 | | |
| Total | | 100 | | |

Table 7 provides the Voltage Holding Ratio (VHR) data of the two liquid crystal compounds.

TABLE 7

The VHR data of the two liquid crystal compounds

| The codes of the components | The corresponding compound type | VHR-1 | VHR-2 | VHR-3 |
|---|---|---|---|---|
| 3PGP2V | | 99.0% | 85.9% | 90.2% |
| 3PGP2V(2F) | I-3 | 99.1% | 89.3% | 92.2% |

According to the above data, it is found that on the basis that the starting VHRs of the two compounds are close, after the degeneration through UV and high temperature, the compound having two fluorine in the end group was more reliable.

The advantage of the present invention is to provide a liquid crystal composition having at least one of the following characteristics: high upper limit of temperature of a nematic phase, low lower limit of temperature of a nematic phase, low viscosity, large optical anisotropy, large dielectric anisotropy, large electrical resistivity, high stability to ultraviolet light, high stability to heat and the like. Meanwhile, a liquid crystal display device containing the liquid crystal composition is provided.

What is claimed is:

1. A liquid crystal composition, comprising, relative to a total weight of the liquid crystal composition:

8%-50% of a compound expressed by a general formula (I)

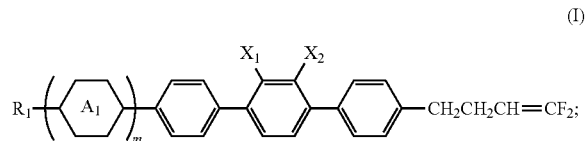

(I)

10%-70% by weight of a compound expressed by a general formula (II)

$$R_2-A_2-A_3-R_3; \quad (II)$$

5%-50% by weight of a compound expressed by a general formula (III)

$$R_4-A_4-(A_5)_n-A_6-Z-\begin{array}{c}X_3\\ \phantom{-}\\ X_4\end{array}-F; \quad (III)$$

0-20% (by weight) of a compound expressed by a general formula (IV)

$$R_5-\bigcirc-\bigcirc-\bigcirc-R_6; \quad (IV)$$

and 0-15% (by weight) of compound expressed by general formula (V)

$$R_7-\bigcirc-\begin{array}{c}X_5\phantom{X}X_6\\ \phantom{-}\\ \end{array}-\begin{array}{c}X_7\phantom{X}X_8\\ \phantom{-}\\ \end{array}-\bigcirc-R_8; \quad (V)$$

wherein, $R_1$ is a $C_{1-10}$ alkyl;

$R_2$, $R_3$ and $R_4$ are independently $C_{1-10}$ alkyl or alkoxy, $C_{2-10}$ alkenyl or $C_{2-10}$ alkenyl of which an arbitrary hydrogen atom is substituted by a fluorine atom;

$X_1$, $X_2$, $X_3$ and $X_4$ are independently hydrogen or fluorine, wherein $X_1$ and $X_2$ are not simultaneously hydrogen or fluorine;

Z is —CO—O—, —O—CO—, —CF$_2$O—, —OCF$_2$—, —CH$_2$O—, —OCH$_2$—, —CH$_2$CH$_2$—, —(CH$_2$)$_4$—, —C$_2$F$_4$—, —CH$_2$CF$_2$—, —CF═CF—, —CH═CH— or a single bond; and m, n are 0 or 1;

$A_1$, $A_2$, $A_3$ are trans-1,4-cyclohexylidene or 1,4-phenylene;

$A_4$, $A_5$ and $A_6$ independently represent one of the following groups:

$R_5$, $R_6$ are independently $C_{1-10}$ alkyl or $C_{2-10}$ alkenyl;

$R_7$, $R_8$ are independently $C_{1-10}$ alkyl;

$X_5$, $X_6$, $X_7$ and $X_8$ are independently hydrogen or fluorine, and for each case, only one of $X_5$, $X_6$, $X_7$ and $X_8$ can be fluorine and the others are all hydrogen, wherein said composition is a liquid crystal composition having at least one of the following characteristics: high upper limit of temperature of a nematic phase, low lower limit of temperature of a nematic phase, large optical anisotropy, large dielectric anisotropy, large electrical resistivity, high stability to ultraviolet light, or high stability to heat.

2. The liquid crystal composition according to claim 1, which comprises:

10%-40% by weight of the compound expressed by the general formula (I),

15%-65% by weight of the compound expressed by the general formula (II), 6-40% by weight of the compound expressed by the general formula (III), 0-15% by weight of the compound expressed by the general formula (IV), and 0-10% by weight of the compound expressed by the general formula (V).

3. The liquid crystal composition according to claim 1, wherein $R_1$ is a $C_{2-7}$ alkyl.

4. The liquid crystal composition according to claim 1, wherein $R_2$, $R_3$ and $R_4$ are independently $C_{2-7}$ alkyl or alkoxy, $C_{2-7}$ alkenyl or $C_{2-7}$ alkenyl of which an arbitrary hydrogen atom is substituted by a fluorine atom.

5. The liquid crystal composition according to claim 1, wherein Z is —CF$_2$O—, —CH$_2$CH$_2$— or a single bond.

6. The liquid crystal composition according to claim 1, wherein $A_4$, $A_5$ and $A_6$ independently represent a group selected form the groups consisting of:

7. The liquid crystal composition according to claim 1, wherein $R_5$, $R_6$ are independently $C_{2-7}$ alkyl or $C_{2-7}$ alkenyl.

8. The liquid crystal composition according to claim 1, wherein $R_7$, $R_8$ are independently $C_{2-7}$ alkyl.

9. The liquid crystal composition according to claim 1, comprising:

7% by weight of compound I of formula I-1

7% by weight of compound I of formula I-2

7% by weight of compound I of formula I-3

46% by weight of compound II of formula II-1

5% by weight of compound II of formula II-2

6% by weight of compound III of formula III-1

6% by weight of compound III of formula III-2

6% by weight of compound III of formula III-3

5% by weight of compound III of formula III-4

5% by weight of compound III of formula III-5

10. The liquid crystal composition according to claim 1, comprising:

6% by weight of compound I of formula I-1

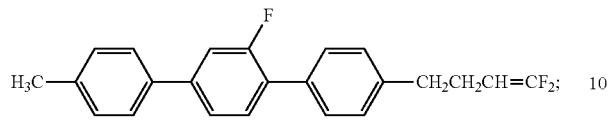

I-1

6% by weight of compound I of formula I-2

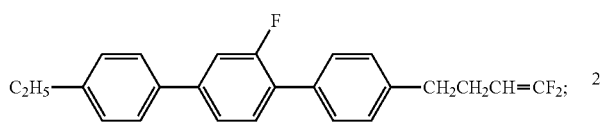

I-2

7% by weight of compound I of formula I-3

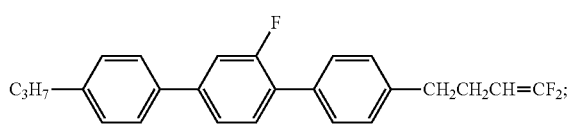

I-3

46% by weight of compound II of formula II-1

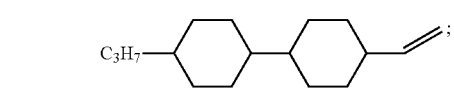

II-1

5% by weight of compound II of formula II-2

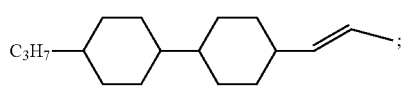

II-2

6% by weight of compound III of formula III-1

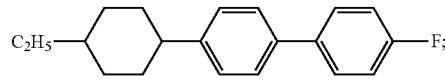

III-1

6% by weight of compound III of formula III-2

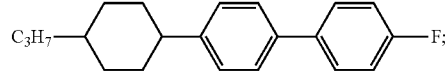

III-2

6% by weight of compound III of formula III-3

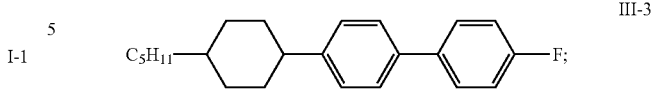

III-3

6% by weight of compound III of formula III-6

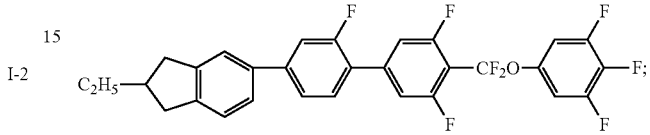

III-6

6% by weight of compound III of formula III-7

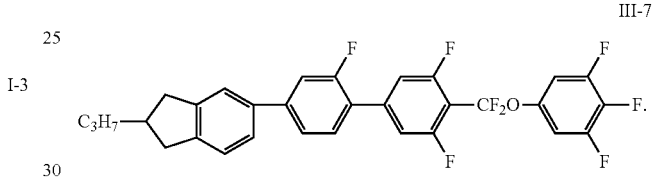

III-7

11. The liquid crystal composition according to claim 1, comprising:

6% by weight of compound I of formula I-1

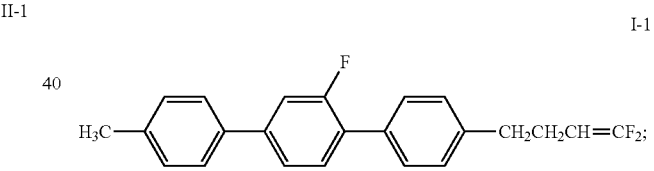

I-1

6% by weight of compound I of formula I-2

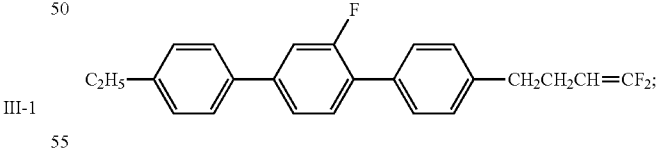

I-2

7% by weight of compound I of formula I-3

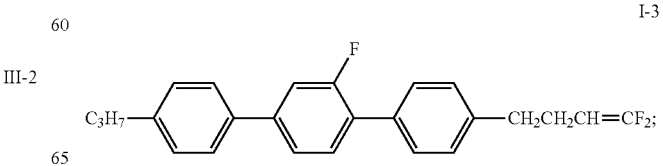

I-3

47% by weight of compound II of formula II-1

II-1: C3H7–[cyclohexyl]–[cyclohexyl]–CH=CH2 ;

6% by weight of compound II of formula II-3

II-3: C5H11–[phenyl]–[phenyl]–CH3 ;

4% by weight of compound III of formula III-1

III-1: C2H5–[cyclohexyl]–[phenyl]–[phenyl]–F ;

4% by weight of compound III of formula III-2

III-2: C3H7–[cyclohexyl]–[phenyl]–[phenyl]–F ;

5% by weight of compound III of formula III-6

III-6: C2H5–[indane]–[difluorophenyl]–[difluorophenyl]–CF2O–[trifluorophenyl]–F ;

6% by weight of compound III of formula III-7

III-7: C3H7–[indane]–[fluorophenyl]–[difluorophenyl]–CF2O–[trifluorophenyl]–F ;

2% by weight of compound III of formula III-8

III-8: C3H7–[indane]–[difluorophenyl]–CF2O–[difluorophenyl]–F ;

4% by weight of compound IV of formula IV-1

IV-1: C3H7–[cyclohexyl]–[cyclohexyl]–[phenyl]–C3H7 ;

3% by weight of compound V of formula V-1

V-1: C3H7–[cyclohexyl]–[fluorophenyl]–[phenyl]–[cyclohexyl]–C3H7.

12. A liquid crystal display device, comprising a liquid crystal composition according to claim 1.

13. A liquid crystal display device, comprising a liquid crystal composition according to claim 2.

* * * * *